(12) United States Patent
Son

(10) Patent No.: US 8,627,716 B2
(45) Date of Patent: Jan. 14, 2014

(54) CAPACITIVE PROXIMITY TACTILE SENSOR

(75) Inventor: Jae S. Son, Rancho Palos Verdes, CA (US)

(73) Assignee: Pressure Profile Systems Inc., Los Angeles, CA (US)

(*) Notice: Subject to any disclaimer, the term of this patent is extended or adjusted under 35 U.S.C. 154(b) by 1015 days.

(21) Appl. No.: 12/701,269

(22) Filed: Feb. 5, 2010

(65) Prior Publication Data

US 2010/0201650 A1    Aug. 12, 2010

Related U.S. Application Data

(60) Provisional application No. 61/150,580, filed on Feb. 6, 2009.

(51) Int. Cl.
*A61B 5/00* (2006.01)
*G01L 9/12* (2006.01)

(52) U.S. Cl.
USPC .............................................. 73/172; 73/718

(58) Field of Classification Search
None
See application file for complete search history.

(56) References Cited

U.S. PATENT DOCUMENTS

| | | | | |
|---|---|---|---|---|
| 4,266,263 A * | 5/1981 | Haberl et al. | ............... | 361/283.2 |
| 4,370,697 A * | 1/1983 | Haberl et al. | ............... | 361/283.1 |
| 4,984,128 A * | 1/1991 | Cebon et al. | ............... | 361/283.1 |
| 5,945,980 A * | 8/1999 | Moissev et al. | ............... | 345/173 |
| 6,610,936 B2 * | 8/2003 | Gillespie et al. | ........... | 178/18.01 |
| 7,219,449 B1 * | 5/2007 | Hoffberg et al. | ................... | 36/88 |
| 7,952,261 B2 * | 5/2011 | Lipton et al. | .................. | 310/339 |
| 8,289,290 B2 * | 10/2012 | Klinghult | ...................... | 345/173 |
| 2002/0149571 A1 * | 10/2002 | Roberts | ......................... | 345/174 |
| 2003/0234769 A1 | 12/2003 | Cross | | |
| 2004/0100448 A1 * | 5/2004 | Moshrefzadeh | ............... | 345/173 |
| 2007/0085837 A1 | 4/2007 | Ricks | | |
| 2007/0242037 A1 | 10/2007 | Son | | |
| 2007/0257821 A1 | 11/2007 | Son | | |
| 2010/0020032 A1 * | 1/2010 | Mamba et al. | ................. | 345/173 |
| 2011/0057899 A1 * | 3/2011 | Sleeman et al. | ............... | 345/174 |

FOREIGN PATENT DOCUMENTS

EP      2214082 A1 *    8/2010

* cited by examiner

*Primary Examiner* — Lisa Caputo
*Assistant Examiner* — Jermaine Jenkins
(74) *Attorney, Agent, or Firm* — Boris Leschinsky

(57) ABSTRACT

A novel capacitive proximity tactile sensor is formed by an electrode layer and a compressible non-conductive layer. Positioning a conductive object in contact with the sensor and applying contact force onto the sensor surface allows for both detecting the location of touch (as in traditional proximity sensors) as well as measuring contact force (as in tactile array sensors) due to a capacitance-measuring sensor formed between the electrode layer and the object with the compressible non-conductive layer therebetween. Useful applications of the sensor include input device for consumer electronic item, flexible and thin weight scale, shoe insole for monitoring pressure distribution of a foot while walking, pressure-monitoring seat cushion and others.

10 Claims, 8 Drawing Sheets

CAPACITIVE PROXIMITY TACTILE SENSOR

CROSS REFERENCE TO RELATED APPLICATIONS

This application claims a priority benefit from a U.S. provisional patent application No. 61/150,580 by the same inventor, which was filed Feb. 6, 2009 with the same title. This application is expressly incorporated herein in its entirety by reference.

BACKGROUND OF THE INVENTION

The present invention relates generally to capacitive proximity sensors. More particularly, the sensor of the invention utilizes a proximity array sensor covered with a layer of compressible non-conducting material allowing it to detect both the presence of a conductive object nearby and the force applied by such object onto the sensor surface.

Capacitive touch sensors are commonly used as an input device in consumer electronics. iPhone by Apple, Inc. for example is a widely-used device with an improved user interface made possible by using a proximity touch sensor input device. While the sensitivity of such capacitive touch sensors is very high in detecting the presence or absence of a conductive object nearby, they cannot be used effectively to measure the progressive force applied by the object onto the surface of the sensor. Proximity sensors are used in other known applications of the prior art, such as capacitive touch panels comprising a grid of electrodes formed in rows and columns as shown in FIG. 1. They provide very sensitive object detection because the sensing mechanism is in the electrical properties of the sensor using grounded or conductive object such as a finger, bare foot or metal. However, this proximity effect does not measure the pressure or the force applied by the object such as the foot. Instead, by integrating all the measurements it effectively provides the foot size rather than the person's weight—studies of scale performance have shown them to be inaccurate. Their reading also highly depends on whether the person is wearing socks or not.

Tactile array sensors on the other hand, do measure the actual contact pressures and can integrate those into contact forces. However, their performance is frequently not accurate enough for many common applications such as for example with force-sensing resistors (FSR). Another disadvantage of tactile array sensors is difficulty and complexity of their fabrication.

A cross sectional view of a tactile sensor array sensor of the prior art (U.S. Pat. No. 7,609,178 by the same inventor) is shown in FIG. 2. It includes a first electrode 101 separated from the second electrode 103 by a gap 105. Compression of electrode by an object 104 in the area 110 results in changing of capacitance between the two electrodes which is then detected by the control unit. A highly sensitive tactile sensor of this design requires a molded structure to support the ground electrode. By integrating all the pressure measurements, a total force or weight can be extrapolated. Applications like this requiring both high sensitivity and durability against large shear forces such as when a person is stepping and walking on the sensor, pose a big challenge since the ground electrode can delaminate from the mounted substrate.

The need exists therefore for a highly sensitive and reliable sensor which is easily manufactured and provides for both the accuracy of the tactile sensor and the sensitivity of the proximity sensor.

SUMMARY OF THE INVENTION

Accordingly, it is an object of the present invention to overcome these and other drawbacks of the prior art by providing a novel capacitive proximity tactile sensor integrating both touch detecting and force measurement functions into a single device.

It is another object of the present invention to provide a capacitive tactile sensor capable of both sensing the touch and measuring the contact force by a grounded or electrically conductive object including a human body of a part thereof.

It is a further object of the present invention to provide a capacitance proximity tactile sensor which is amenable for simple manufacturing process.

It is a yet another object of the present invention to provide a capacitance proximity tactile sensor with uniform sensitivity.

It is yet another object of the present invention to provide a capacitance tactile sensor that is flexible and can be bent or folded around or onto a flat or curved surface.

The sensor of the invention includes a capacitive sensing electrode layer and a compressible non-conductive layer. When a conductive object is placed nearby, a proximity sensor is formed between the capacitive sensing electrode and the conductive object allowing detection of location of touch. At the same time, applying force by the object causes compression of the non-conductive layer. A capacitance tactile sensor is formed between the sensing electrode and the conductive object with the non-conductive layer therebetween. Measuring capacitance between the sensing electrode and the conductive object allows one to determine the gap between the object and the electrode. In turn, knowing the gap allows calculating the applied force at that location from a known compressibility parameter of the non-conductive material. Integrating force data from a plurality of locations where the material is compressed and where the touch is detected allows calculating the overall contact force or weight of the object.

BRIEF DESCRIPTION OF THE DRAWINGS

A more complete appreciation of the subject matter of the present invention and the various advantages thereof can be realized by reference to the following detailed description in which reference is made to the accompanying drawings in which.

DETAILED DESCRIPTION OF PREFERRED EMBODIMENTS OF THE INVENTION

A detailed description of the present invention follows with reference to accompanying drawings in which like elements are indicated by like reference letters and numerals.

Figure 1:
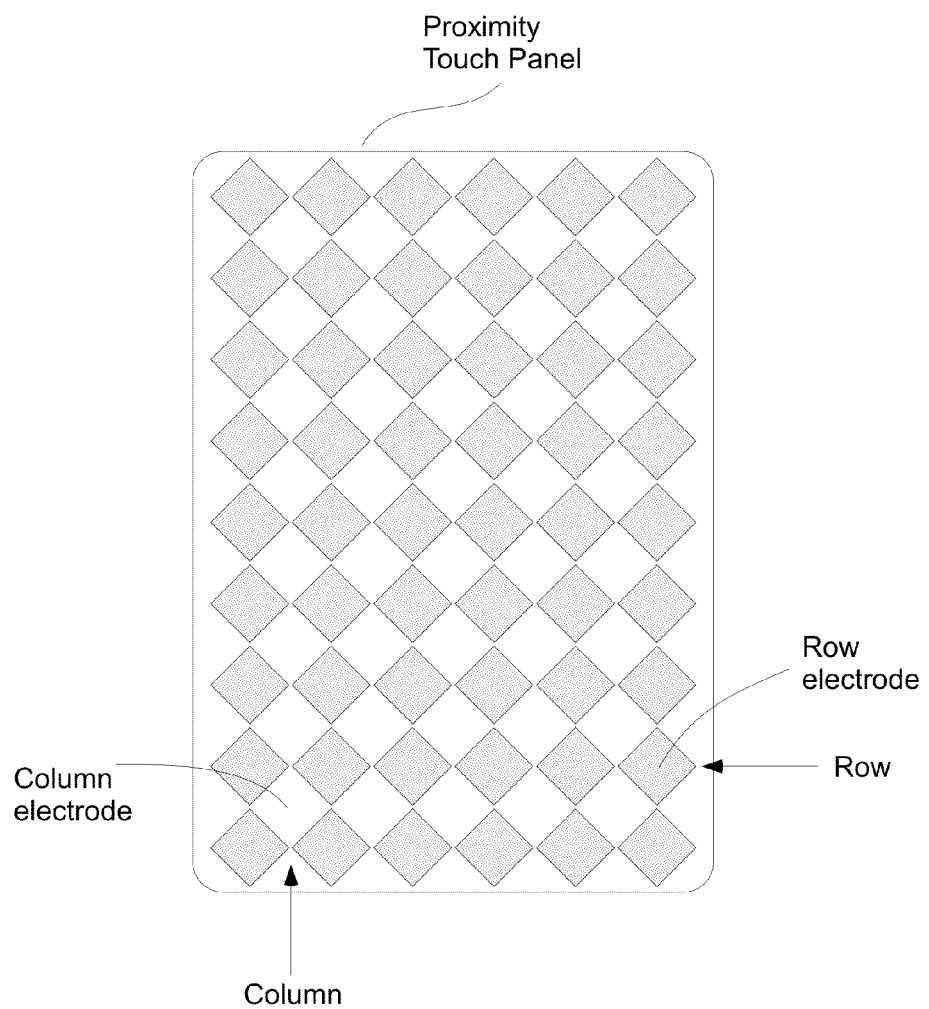
FIG. 1 is a general depiction of the proximity sensor of the prior art.
Figure 2:
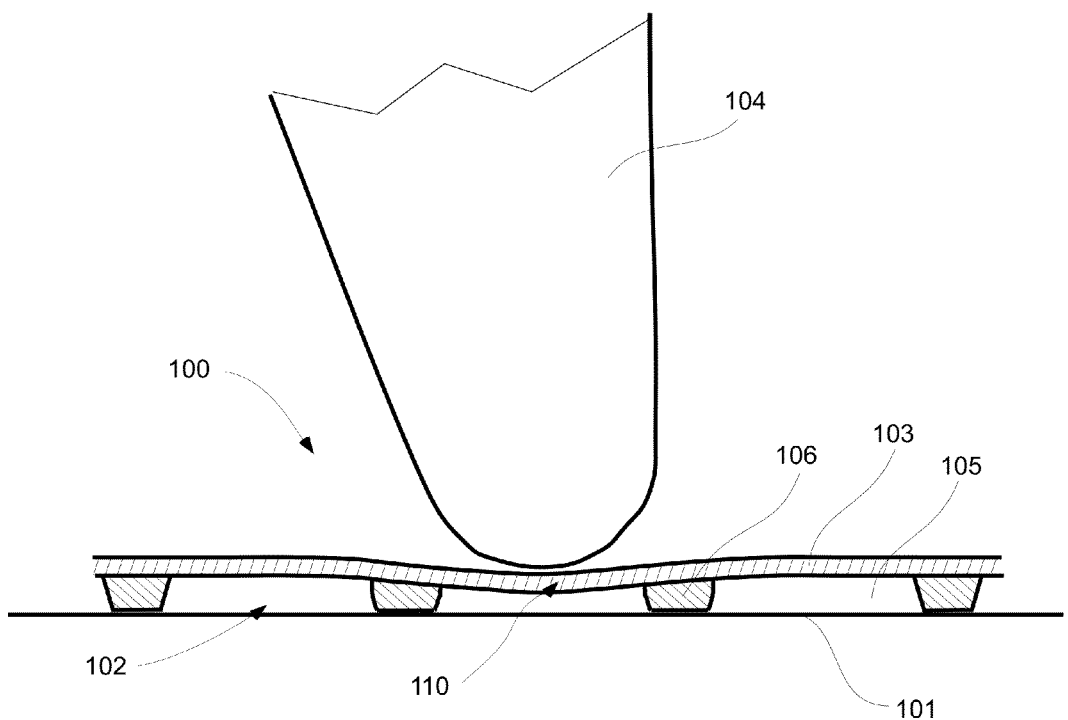
FIG. 2 is a general illustration of the capacitance tactile sensor of the prior art.
Figure 3:
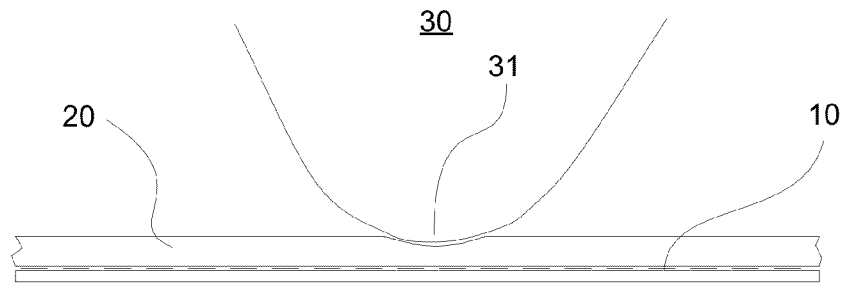
FIG. 3 is a general illustration of the sensor of the invention with a conductive object placed over it.

FIG. 3 depicts the general illustration of the sensor of the present invention which includes two main elements—At least one capacitive sensing electrode layer 10 and a compressible non-conductive layer 20. The capacitive sensing electrode layer 10 is formed in a manner similar to that of traditional proximity sensor arrays. It contains a number of locations (pixels) capable of measuring electrical and capacitive characteristics when a conductive object 30 is positioned nearby. Specific number of pixels and their design depend highly on a particular application; some examples of those are described in more detail below. Signals from individual pixels are transmitted via a cable (not shown) to a control unit (not shown). In some applications, the control unit is incorporated within the sensor device itself and mounted nearby, optionally on the same supporting substrate as the sensor itself. Any capacitance sensing IC commonly found for touch sensors could be used for this invention.

The thickness of the compressible layer and the sensor element size can be adjusted such that when the object makes contact, the signal from the proximity effect is within the noise level of the IC. In this configuration, the proximity effect is minimized and the sensor acts like a traditional tactile sensor measuring contact pressure and force.

A compressible non-conductive layer 20 is positioned over the electrode layer 10. It can be as simple as a layer of polyurethane foam. Importantly, compression parameters of this layer are known in advance. Material selection, thickness, and compressibility are selected based on the needs of a particular application—see examples below. In addition to polyurethane, silicon or thermoplastic elastomer foam can also be used. It is important to properly estimate the minimum and the maximum contact forces for each application. The guiding principle behind the material and thickness selection is to ensure that the compressible layer is deformed within its elastic progressive deformation range. It is selected to be soft enough to be at least partially deformed by the anticipated minimum contact force so as to provide adequate sensitivity for a particular application. At the same time, the maximum anticipated contact force should not cause the material to go outside its progressive compression range. Exceeding the progressive compression range may lead to poor sensor performance or at least cause saturation in the sensor reading and therefore cause an error in the output signal.

Traditional calibration process where a known force or pressure is applied using the object that will make contact with the sensor provides a calibration curve where the sensor output in digital counts can be converted to pressure or force. It is important that the object that will make contact with the sensor is known a priory for proper use of this sensor.

The sensor of the present invention effectively combines the function of a proximity sensor and the function of the capacitance measuring tactile sensor. When a conductive object 30 is placed over the compressible layer 20 and a certain force is applied over the sensor surface, the compressible layer 20 is deformed under the object 30 over the area 31. The proximity-sensing touch detection portion of the sensor uses the close presence of a conductive object 30 for a traditionally known detection of location of touch which can be used as a first input signal.

At the same time, capacitance sensing circuit between the electrode layer 10 and the conductive object 30 allows to determine the gap therebetween over a number of points encompassed by the area 31. At each point where the gap is determined by measuring capacitance, a local force may be then calculated from a known compression characteristic of the compressible layer 20. Integration of force data points over the entire area 31 allows calculating a total contact force of the object 30 pushing against the sensor of the invention even though the object 30 may have an irregular shape. Contact force can be used as a second input signal independent of that of the first input signal generated by the proximity detection part of the sensor.

According to the method of the invention, detection of touch location and contact force is therefore accomplished by the following steps:

a. providing a capacitance proximity tactile sensor comprising an electrode layer and a compressible non-conductive layer exposed to a conductive object; the compressible layer characterized by a progressive compressibility range defining a minimal contact force and a maximum contact force, b. upon application of a contact force by the conductive object in a range between a minimum contact force and a maximum contact force, detecting a location of touch using electrical properties of the sensor and based on a close proximity of the conductive object, c. measuring capacitance throughout the contact area between the object and the sensor, d. calculating the thickness distribution of the deformed compressive layer from the capacitance data, e. calculating force distribution over the contact area from the thickness distribution and predetermined compression properties of the non-conductive layer, and f. calculating contact force from the force distribution data.

Alternatively, a calibration curve can be created to determine the contact force based on correlating the capacitance measurement with a known applied force.

Importantly, both the electrode layer and the compressible non-conductive layer can be flexible making the entire sensor flexible. This may be advantageously used in a number of potential applications of the present invention in addition to the numerous application illustrated. For example a sensor for measuring the force exerted by the tongue within the mouth can be created provided that the sensor is sealed using a thermally-formed layer of polyurethane or dipped in a water-based barrier coating.

Figure 4:
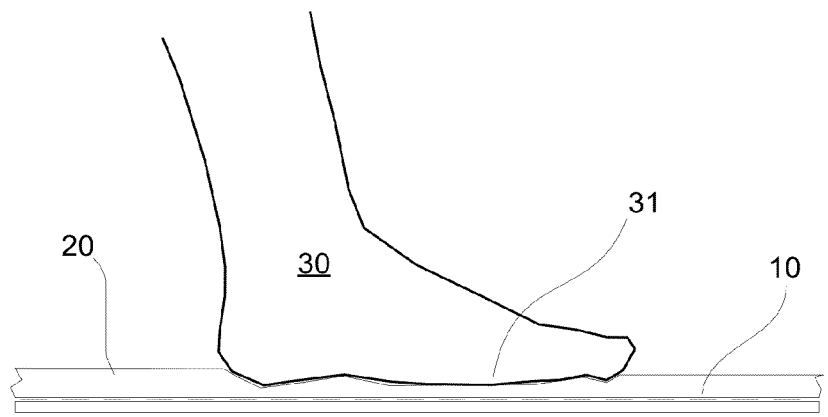
FIG. 4 shows an application of the sensor of the present invention as a pressure mapping mat.

The following description provides examples of applications for the present invention. FIG. 4 illustrates a general use of the sensor of the invention to detect pressure distribution under a human foot when the person steps on the sensor. The foot in this case plays a role of a conductive object 30. The thickness and stiffness of the compressible layer are selected to accommodate the depression of the layer over the typical weight ranges of human beings, for example 20 lbs to 400 lbs. Compression of the layer 20 by a foot 30 is translated into a plurality of capacitance measurements over the sensor deformation area 31. These measurements are used to calculate the thickness distribution of the layer 20 and then using the compressibility characteristic of the material of the layer 20, the pressure distribution is calculated by the control unit. One important advantage of this application is that the presence or absence of a sock does not appreciably change the readout of the sensor.

Importantly, the presence of the compressible layer 20 also allows for local redistribution of deformation forces which is happening inherently within the layer 20. This allows for more uniform sensitivity of the sensor of the invention as compared with the prior art sensors.

Figure 6A:
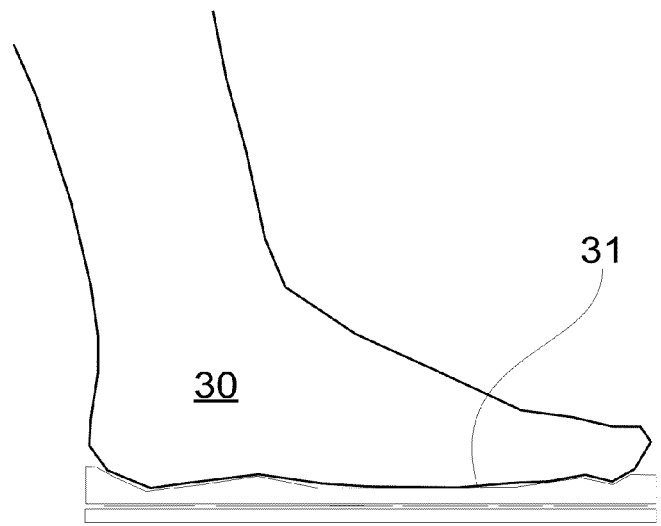
FIGS. 6A and 6B show an application of the sensor of the present invention as a pressure distribution-measuring shoe insole sensor.
Figure 6B:
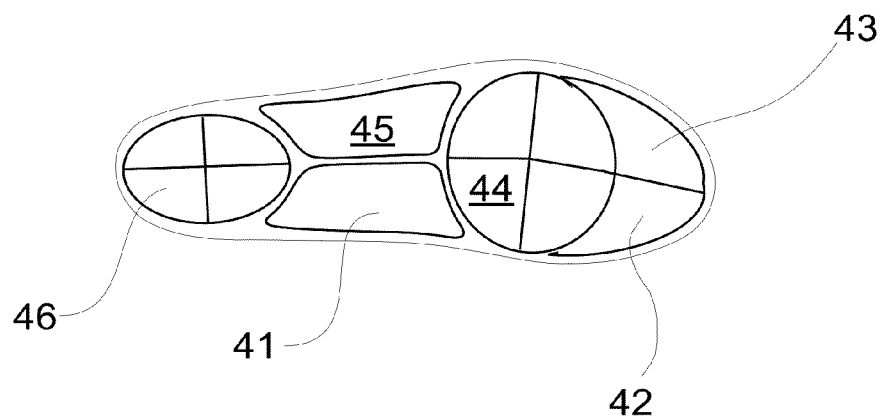

Knowing the pressure distribution of a human foot over the sensor surface may be used in a variety of applications. One useful application of the invention is a shoe insole capable of recording a foot pressure distribution of a walking person. This sensor is shown in FIGS. 6A (side view) and 6B (top view). Deterioration in mobility of an elderly person is a major cause of falls and injuries. Studies have shown that a change in gait frequently precedes the actual event of a fall. Many devices are known to be used for gait monitoring. A simple and unobtrusive shoe insole shown on FIG. 6 can be used as a short-term or long-term gait monitoring tool. This sensor could also be used as an easy to fabricate insole tactile sensor that can use the pressure distribution information to monitor balance, pressure sores, performance, power, force, and weight. A typical insole design would include at least one or preferably a plurality of sensing zones 41 through 46 so as to monitor pressure over a number of points under the foot. The insole sensor could be calibrated easily for weight by asking the person to lift each foot separately, and stand balanced with both feet. By entering the person's weight into the processing unit, the entire weight on one foot, half the weight on one foot and no weight can be calibrated.

Figure 7A:
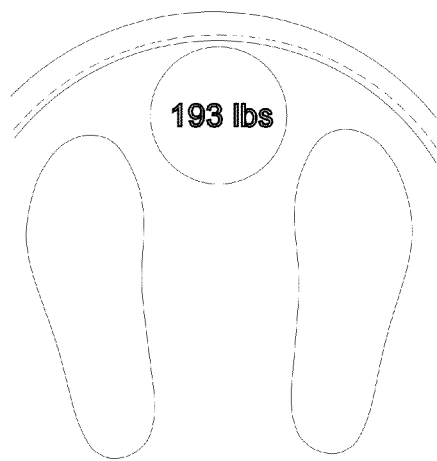
FIGS. 7A and 7B show an application of the sensor of the present invention as a flexible bathroom scale.
Figure 7B:
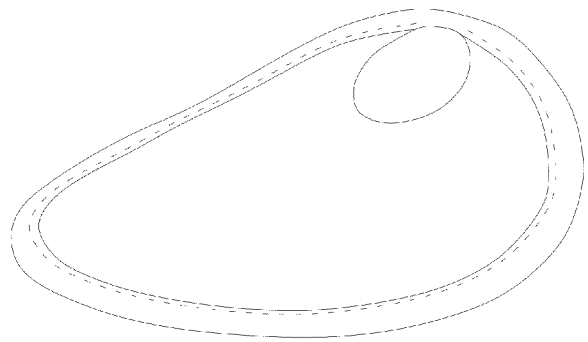

Another useful application of the sensor of the invention is in making a flexible, durable and thin bathroom weight scale. It can be placed like a rug allowing people to walk over it without tripping. Due to its thin nature, it can be placed in more convenient locations, for example in the middle of the bathroom, or perhaps even in some unavoidable locations (by the entrance door) for measuring one's own weight. The flexibility of the sensor would allow it to operate on uneven surfaces such as an old house with uneven flooring. The compression of the foam when stepping on the scale will provide a soft and soothing feel. The design of such bathroom scale is shown on FIG. 7A as a top view and a perspective view is shown on FIG. 7B illustrating its flexible nature.

Figure 5:
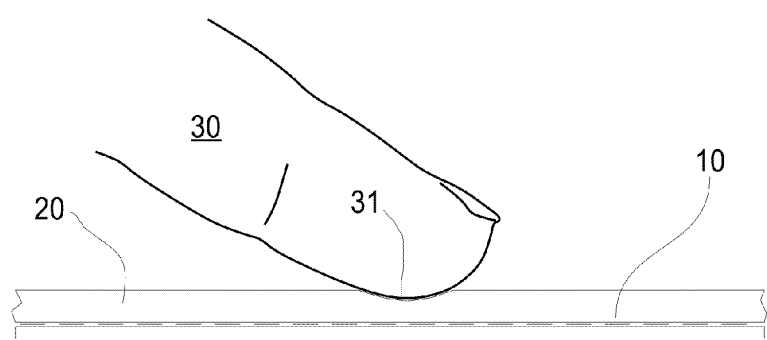
FIG. 5 shows an application of the sensor of the present invention as a force-measuring input device for a consumer electronic item.

The capacitive proximity tactile sensor of the invention can be used similarly to a traditional proximity touch input device but with the added benefit for force detection. Conceptually, this application is shown in FIG. 5. The finger of the user is a conductive object 30 in this example. This simple enhancement to the common proximity touch sensor can be very valuable to personal mobile devices and game controllers by generating both the location input signal and a progressive force signal. This force level signal in turn can be used for controlling such parameters as a speed of scrolling or a character or vehicle velocity. For games like Guitar Hero where the user's hand location is supposed to follow a series of preprogrammed actions, a higher level of difficulty can be assigned by requiring the person to not only follow the action sequence, but also to control different levels of applied pressure or force. An added benefit of the compliant layer is the natural haptic feedback, which the user gains by the action of compressing the foam during operation of the sensor as well as a softer and more soothing feel.

Figure 8:
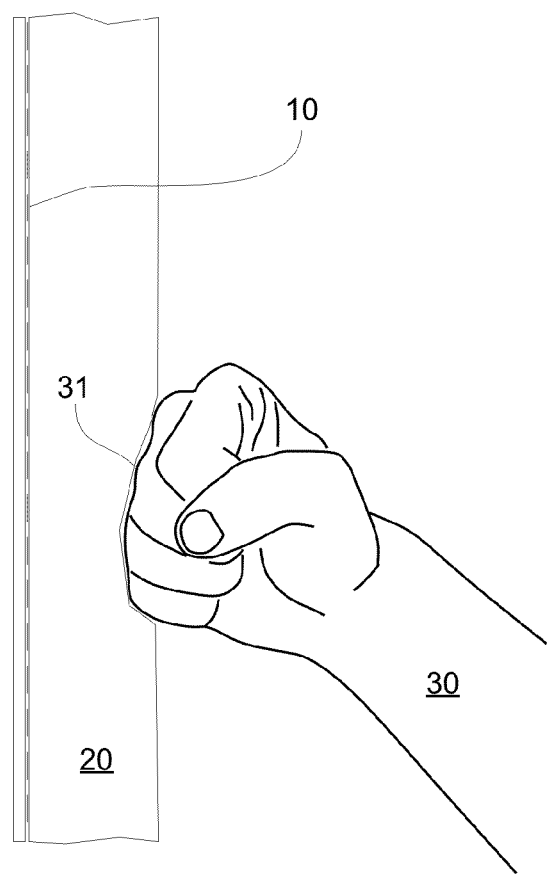
FIG. 8 shows an application of the sensor of the present invention as an impact force measuring sensor for using with a punch-bag, and finally

FIG. 8 shows an example of using a thicker compressible layer designed to withstand an impact from a punching action. This application allows creation of a force and power monitor useful in training athletes. For boxing application, the sensor of the invention may alternatively be incorporated into a boxing glove (not shown on the drawings).

Figure 9:
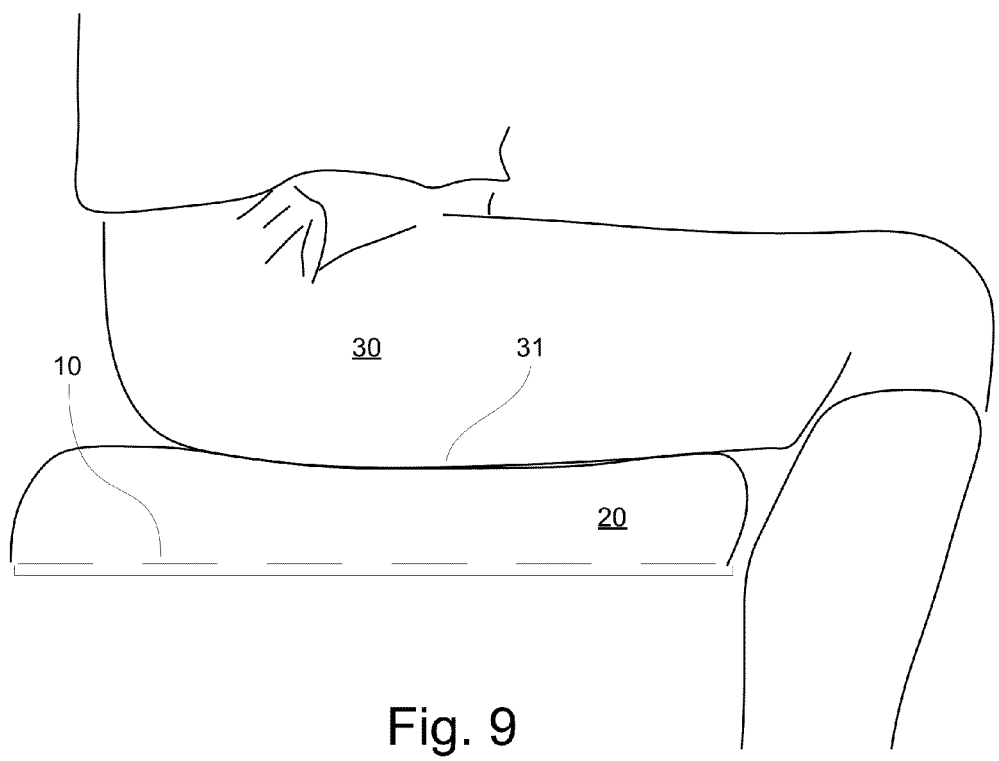
FIG. 9 shows an application of the sensor of the present invention in a seat cushion.

FIG. 9 shows a seat equipped with pressure distribution monitor. By inserting the capacitance electrodes underneath a seat cushion that acts as a compliant dielectric layer 20, the person's buttock can serve as the conductive object 30 making a second electrode and thus forming a capacitive proximity tactile sensor. This configuration can serve as an inexpensive and reliable means to detect a presence of a passenger over a front seat in a vehicle so as to activate or disable a respective air bag. It has an important advantage over other types of sensors used for this application that are based on measuring weight. The sensor of the invention will not turn the airbag on when a heavy object other than a person is placed on the seat such as a stack of books or a travel bag for example.

The pressure-monitoring seat or just a seat cushion of the invention can also be used in wheel chairs or adapted to be used on hospital beds to monitor pressure levels so as to prevent pressure sores.

Although the invention herein has been described with respect to particular embodiments, it is understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A capacitive proximity tactile sensor comprising an electrode layer and a compressible non-conductive layer exposed to a conductive object, said compressible layer defining a progressive compressibility range of contact forces, wherein upon application of a contact force within said progressive compressibility range by said conductive object onto said compressible layer, a capacitance sensor is formed between said electrode layer and said conductive object with said compressible non-conductive layer therebetween, whereby said sensor generates two signals: a location of touch signal and a force of touch signal representative of said contact force, said force of touch signal is generated by measuring capacitance between said electrode layer and said conductive object indicating a degree of compression of said compressible non-conductive layer by said conductive object.

2. The sensor as in claim 1, wherein said electrode layer includes an array of electrodes, each electrode adapted to detect location of touch by said conductive object and to measure capacitance between thereof and said object.

3. The sensor as in claim 1, wherein said electrode layer and said compressible non-conductive layers are flexible.

4. The sensor as in claim 1 adapted for use as a flexible weight scale.

5. The sensor as in claim 1 adapted for use as a shoe insole for monitoring pressure distribution under a human foot.

6. The sensor as in claim 1 adapted for use as an input device for a consumer electronics item.

7. The sensor as in claim 1 adapted for use as a punch force monitor.

8. The sensor as in claim 1 adapted for use as a pressure-monitoring seat cushion.

9. The sensor as in claim 1, wherein said compressible non-conductive layer is made from a foam.

10. The sensor as in claim 9, wherein said foam is selected from a group consisting of silicone foam, polyurethane foam, and thermoplastic elastomeric foam.

* * * * *